US012424102B2

(12) United States Patent
Lekutai (10) Patent No.: US 12,424,102 B2
(45) Date of Patent: Sep. 23, 2025

(54) NETWORK ASSISTED PLATOONING FOR SELF DRIVING VEHICLES

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 388 days.

(21) Appl. No.: 17/189,210

(22) Filed: Mar. 1, 2021

(65) Prior Publication Data

US 2022/0277653 A1 Sep. 1, 2022

(51) Int. Cl.
*G08G 1/00* (2006.01)
*B60W 30/165* (2020.01)
(Continued)

(52) U.S. Cl.
CPC .............. *G08G 1/22* (2013.01); *B60W 30/165* (2013.01); *H04W 4/80* (2018.02); *B64U 10/14* (2023.01);
(Continued)

(58) Field of Classification Search
CPC ............... B60W 30/165; B64C 39/024; G05D 2201/0213; G05D 1/0293; G05D 1/0295;
(Continued)

(56) References Cited

U.S. PATENT DOCUMENTS 8,639,396 B1 * 1/2014 Hirsch .................. G05D 1/104
340/995.13
10,440,668 B1 * 10/2019 Wu ......................... H04W 4/46
(Continued)

FOREIGN PATENT DOCUMENTS

JP 2020087261 A * 6/2020
KR 20160137442 A * 11/2016
KR 1020190101925 A 9/2019

OTHER PUBLICATIONS

International Patent Application No. PCT/US2022/017456, International Search Report mailed May 31, 2022, 3 pages.
(Continued)

*Primary Examiner* — Aniss Chad
*Assistant Examiner* — Jennifer M Anda (57) ABSTRACT

Described herein are techniques for facilitating communications between vehicles within a platoon while minimizing latency. In some embodiments, such techniques may be performed by a lead vehicle and may comprise obtaining, from one or more sensors, sensor information pertaining to an environment in which the lead vehicle is located and generating, from the sensor information, driving instructions to be executed by a platoon of vehicles. The techniques may further comprise identifying, within the platoon of vehicles, a plurality of separate groups of vehicles and transmitting the generated driving instructions to a platooning platform via a long-range communication channel such that the driving instructions are relayed to each of the plurality of separate groups of vehicles. The techniques may further comprise transmitting the generated driving instructions to at least one additional vehicle of the platoon of vehicles via a short-range communication channel.

17 Claims, 5 Drawing Sheets

(51) Int. Cl.
*B64U 101/30* (2023.01)
*H04W 4/80* (2018.01)
*B64U 10/14* (2023.01)
*B64U 101/20* (2023.01)

(52) U.S. Cl.
CPC ...... *B64U 2101/20* (2023.01); *B64U 2101/30* (2023.01)

(58) Field of Classification Search
CPC .............. G08G 1/22; G08G 1/096725; G08G 1/096775; G08G 1/096811; H04B 7/18504; H04L 67/12; H04W 4/80; H04W 4/38; H04W 4/46
See application file for complete search history.

(56) References Cited

U.S. PATENT DOCUMENTS

| | | | |
|---|---|---|---|
| 2017/0336788 A1* | 11/2017 | Iagnemma | G05D 1/0055 |
| 2018/0321681 A1* | 11/2018 | Tu | H04W 24/02 |
| 2019/0212725 A1* | 7/2019 | Woodrow | G05D 1/0295 |
| 2019/0225142 A1* | 7/2019 | Switkes | B60Q 1/507 |
| 2019/0373419 A1 | 12/2019 | Bayley et al. | |
| 2020/0380870 A1* | 12/2020 | Eguchi | G08G 5/0078 |
| 2022/0415181 A1* | 12/2022 | Wang | G08G 1/096775 |

OTHER PUBLICATIONS

International Patent Application No. PCT/US2022/017456, Written Opinion mailed May 31, 2022, 6 pages.
European Application No. 22763782.4, Extended European Search Report mailed Jan. 15, 2025, 8 pages.

* cited by examiner

NETWORK ASSISTED PLATOONING FOR SELF DRIVING VEHICLES

BACKGROUND

Platooning is a term that refers to a technique by which a lead vehicle directs the maneuver of other vehicles from point A to point B and the group of other vehicles follow. Particularly, a platoon is a group of vehicles that can travel very closely together, safely and at high speed.

SUMMARY

In conventional platooning platforms, a lead vehicle passes information from vehicle to vehicle via short-range communication channels. In such platooning platforms, each vehicle in a platoon receives instructions from the vehicle in front of it, executes those instructions, and relays the instructions to the vehicle behind it. In this way, actions taken by the lead vehicle are passed from vehicle to vehicle in a chain. However, when there is a large number of vehicles, the latency of the communications between each of the vehicles can add up, such that there might be a significant lag between an action taken by the lead vehicle and the last vehicle.

Techniques are provided herein for facilitating communications between vehicles in a platoon of vehicles. Such techniques may comprise segmenting a platoon of vehicles into a number of smaller groups of vehicles. A lead vehicle may be assigned to each respective group of vehicles, such that the lead vehicle may receive driving instructions from a remote system and relay those driving instructions to other vehicles in the group of vehicles. In some embodiments, an unmanned aerial vehicle (UAVs) may maintain a position proximate to a group of vehicles. In these embodiments, the UAV may receive driving instructions from a remote system via a long-range communication channel and may relay those instructions to the vehicles in the group of vehicles substantially simultaneously.

Embodiments of the disclosure provide several advantages over conventional systems. For example, embodiments of the system described herein enable facilitation of communications between multiple vehicles in a manner that minimizes latency between those communications. This enables a lead vehicle of a platoon that includes any number of vehicles to traverse without a significant delay between the instructions being sent by a lead vehicle and those instructions being received by each of the other vehicles in the platoon. By minimizing a delay between communication transmission and reception, the system is able to reduce risks associated with high-speed traversal by the platoon's vehicles in a formation.

In one embodiment, a method is disclosed as being performed by a lead vehicle in communication with a platooning platform, the method comprising obtaining, from one or more sensors in the lead vehicle, sensor information pertaining to an environment in which the lead vehicle is located, generating, from the sensor information, driving instructions to be executed by a platoon of vehicles, identifying, within the platoon of vehicles, a plurality of separate groups of vehicles, transmitting the generated driving instructions to a platooning platform via a long-range communication channel, the driving instructions being relayed to each of the plurality of separate groups of vehicles by the platooning platform, and transmitting the generated driving instructions to at least one additional vehicle of the platoon of vehicles via a short-range communication channel.

An embodiment is directed to a computing device comprising: a processor; and a memory including instructions that, when executed with the processor, cause the computing device to obtain, from one or more sensors, sensor information pertaining to an environment in which the computing device is located, generate, from the sensor information, driving instructions to be executed by a platoon of vehicles, identify, within the platoon of vehicles, a plurality of separate groups of vehicles, transmit the generated driving instructions to a platooning platform via a long-range communication channel, the driving instructions being relayed to each of the plurality of separate groups of vehicles by the platooning platform, and transmit the generated driving instructions to at least one additional vehicle of the platoon of vehicles via a short-range communication channel.

An embodiment is directed to a non-transitory computer-readable media collectively storing computer-executable instructions that upon execution cause one or more computing devices to obtaining, from one or more sensors, sensor information pertaining to an environment in which the computer-readable media is located, generating, from the sensor information, driving instructions to be executed by a platoon of vehicles, identifying, within the platoon of vehicles, a plurality of separate groups of vehicles, transmitting the generated driving instructions to a platooning platform via a long-range communication channel, the driving instructions being relayed to each of the plurality of separate groups of vehicles by the platooning platform, and transmitting the generated driving instructions to at least one additional vehicle of the platoon of vehicles via a short-range communication channel.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to facilitate communications between vehicles within a platoon of vehicles while minimizing a delay associated with those communications. In some embodiments, a lead vehicle transmits driving instructions using a combination of long-range and short-range communication channels. In at least some of these embodiments, the lead vehicle transmits the instructions to a remote platform using the long-range channel (e.g., over a cellular network) and simultaneously transmits those driving instructions to one or more vehicles within its vicinity via a short-range communication channel (e.g., over a WiFi connection, DSRC, Sidelink/PC5, etc.).

In some embodiments, a platoon of vehicles may be broken up into a number of different groups of vehicles. In at least some of these embodiments, each group of vehicles may be assigned a group lead vehicle to receive the driving instructions from the remote platform via a long-range communication channel and then to distribute those instructions to each of the vehicles within the respective group using the short-range communication channel. For example, the remote system may transmit driving instructions to each group lead vehicle over a cellular network. In this example, each group lead vehicle may then relay those instructions to the vehicles within its respective group via a short-range communication channel.

In some embodiments, the techniques may further include interactions between the vehicles and one or more unmanned aerial vehicles configured to relay communications to various vehicles of a platoon. In some embodiments, each UAV may maintain a position above a group of vehicles such that the UAV maintains line-of-sight with each of the group of vehicles. The UAV may receive the instructions from the remote platform and relay the instructions to vehicles within that group via the short-range communication channel.

Figure 1:
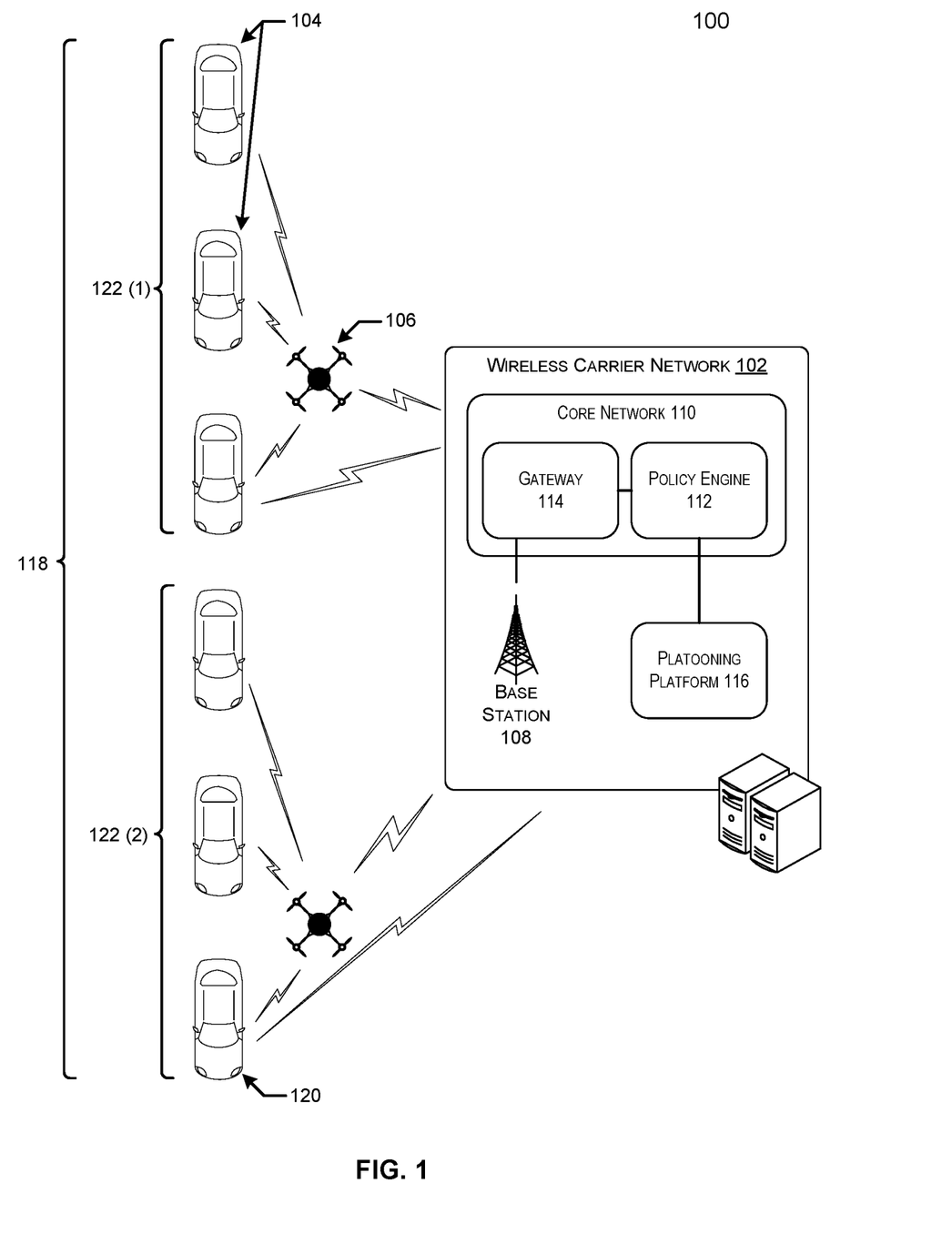
FIG. 1 illustrates an example architecture of a wireless carrier network for implementing techniques for providing improved vehicle platooning in accordance with embodiments.

FIG. 1 illustrates an example architecture of a wireless carrier network for implementing techniques for providing improved vehicle platooning in accordance with embodiments. The architecture 100 may include a wireless carrier network 102 that serves multiple vehicles 104. In some embodiments, the system 100 may further include one or more unmanned aerial vehicles (UAVs) 106 in communication with the vehicles 104 and the wireless carrier network 102.

The wireless carrier network 102 may include multiple base stations, such as the base station 108, as well as a core network 110. The wireless carrier network 102 may provide telecommunication and data communication over a cellular network in accordance with one or more technical standards, such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), $4^{th}$ Generation (4G), $5^{th}$ Generation (5G), and/or so forth. The base stations are responsible handling data traffic between user devices and the core network 110. In some embodiments, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The core network 110 may provide telecommunication and data communication services to multiple vehicles 104. For example, the core network 110 may connect the vehicles 104 to other vehicles 104 and/or one or more UAVs 106. The core network 110 may further include a policy engine 112 and a gateway 114. In some embodiments, the wireless carrier network 102 may include, or at least be in communication with, a platooning platform 116 that facilitates communications between one or more vehicles 104. In some embodiments, the policy engine 112 may be configured to identify communications associated with platooning operations and route those communications to the platooning platform 116. It should be noted that while the platooning platform 116 is depicted as being included within the wireless carrier network, this is intended to be exemplary in nature. In some embodiments, the platooning platform 116 may be independent of the wireless carrier. For example, the functionality attributed to the platooning platform herein may be implemented on computing devices outside of the wireless carrier network.

The policy engine 112 may be a software component that determines policy and enforces policy rules and serves to establish calls and allocate bandwidth to communications routed via the wireless carrier network. In various embodiments, the policy engine 112 may include a Policy and Charging Rules Function (PCRF) or another equivalent core network component of the wireless carrier network 102.

The gateway 114 may include one or more servers and related components that are tasked with providing connectivity at least between the core network 110, multiple vehicles 104, and one or more UAVs 106 by acting as a point of entry and exit for data traffic. In some embodiments, the core network 110 may provide connectivity between the components described above and one or more user devices (e.g. mobile devices, personal computing devices, etc.). Accordingly, the gateway 114 may perform functions such as policy enforcement, packet filtering, packet screening, and/or charging support. In various embodiments, the gateway 114 may be a Packet Data Network Gateway (PGW) or another equivalent core network component of the wireless carrier network 102.

The platooning platform 116 may be any suitable combination of software and hardware that is configured to facilitate communication between one of more vehicles in a platoon 118 of vehicles. The platooning platform is configured to receive instructions from the lead vehicle and convey those instructions to other vehicles in the platoon. A platoon 118 may be any number of vehicles traveling in a formation. Such a formation may include any suitable driving pattern. For example, a platoon may include a number of vehicles that are lined up single file. A platoon 118 may include a lead vehicle 120 that provides instructions to the other vehicles in the platoon. In some, but not all, embodiments, the lead vehicle may include a driver that provides at least some instruction to the lead vehicle, which is then passed to the other vehicles in the platoon via the platooning platform. In some embodiments, the lead vehicle of a platoon may be located in a strategic position within the platoon. For example, the lead vehicle may be located at the front of the platoon.

In some embodiments, a platoon 118 that includes multiple vehicles 104 may be broken up into groups 122. For example, a platoon 118 may be broken up into a first group 122 (1) of vehicles and a second group 122 (2) of vehicles. In at least some of these embodiments, each group of vehicles may have a lead vehicle for that group and the lead vehicle for each group may be in communication with the lead vehicle 120 of the platoon. Each respective lead vehicle of a group may communication instructions from the lead vehicle of the platoon to the vehicles within its respective group.

A vehicle 104 may be any suitable machine capable of transportation. At least some of the multiple vehicles 104 may be "self-driving" vehicles that are configured to perform one or more driving functions without the presence of a user (i.e., driver). In various embodiments, each of the multiple vehicles may include a memory that includes computer executable instructions configured to enable self-driving functions through interaction with one or more hardware components of the vehicle.

A UAV 106 may be any suitable unmanned vehicle capable of maintaining line-of-sight with the multiple vehicles. In some embodiments, the UAV may include both short-range and long-range communication mechanisms. In some embodiments, the UAV may relay instructions between a lead vehicle, various vehicles in a group, and/or or other UAVs. In some embodiments, the UAV may receive communications from a lead vehicle using a long-range communication channel and may then relay those communications to one or more vehicles using a short-range communication channel. In some embodiments, the UAV is configured to travel above a group of vehicles within a platoon in such a manner that the UAV maintains line-of-sight with each of the vehicles in a group of vehicles. In these embodiments, the UAV may transmit instructions received from a lead vehicle to each of the vehicles in a group of vehicles simultaneously (e.g., at substantially the same time).

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
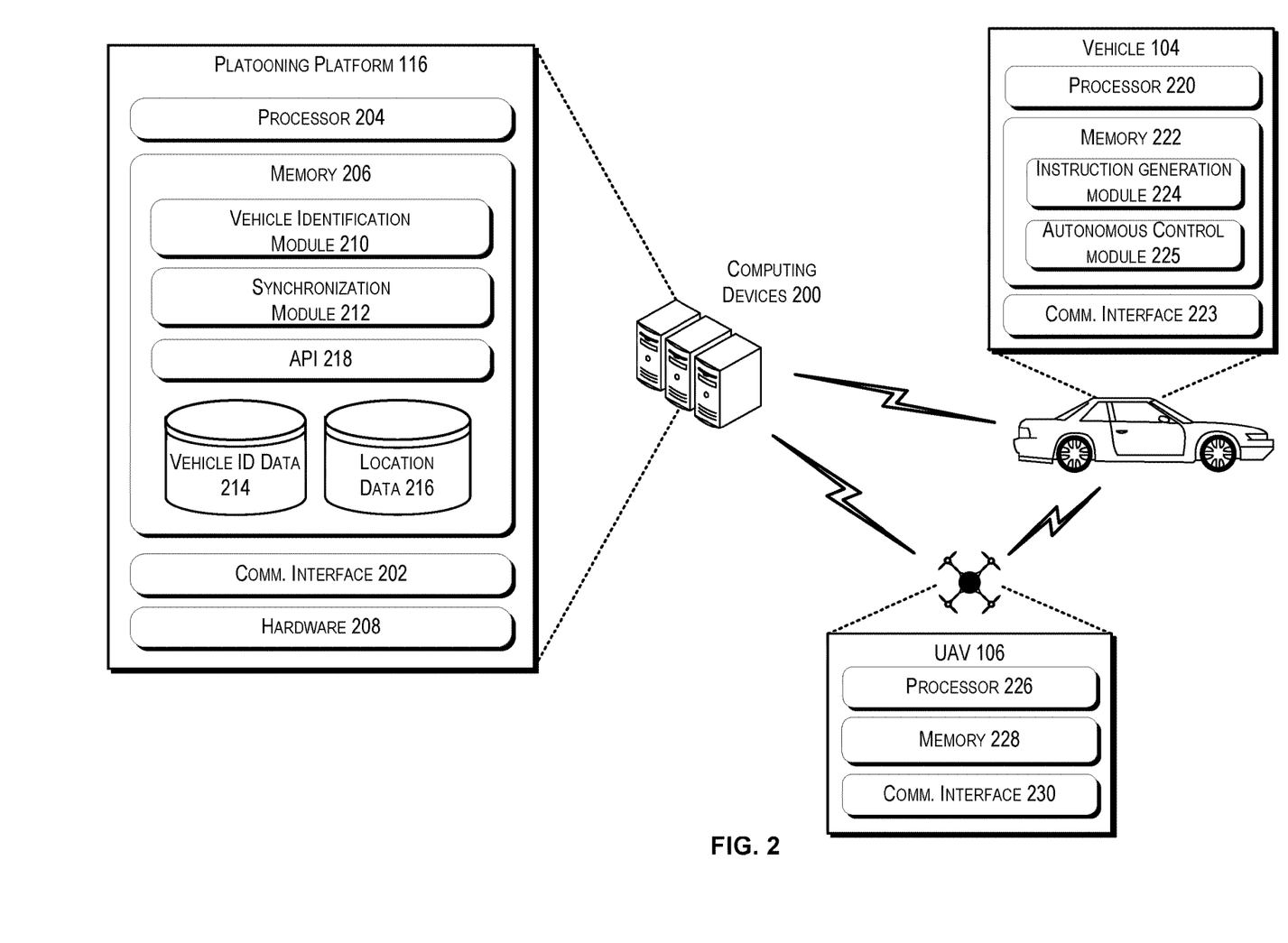
FIG. 2 is a block diagram showing various components of a computing system architecture that supports coordination of vehicular travel within a platoon of vehicles.

FIG. 2 is a block diagram showing various components of a computing system architecture that supports coordination of vehicular travel within a platoon of vehicles. The system architecture may include a platooning platform 116 that comprises one or more computing devices. The platooning platform 116 may include a communication interface 202, one or more processors 204, memory 206, and hardware 208. The communication interface 202 may include wireless and/or wired communication components that enable the platooning platform 116 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The platooning platform 116 can include any computing device configured to perform at least a portion of the operations described herein. The platooning platform 116 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The platooning platform 116 can include one or more virtual machines running virtual operating systems, or other computing architectures involving virtualization such as one or more flexible pools of logical storage devices that can be virtualized to maintain virtual storage devices for the computer. For example, the platooning platform 116 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the platooning platform 116 may implement functionality that includes one or more software modules and data stores. Such software modules may include routines, program instructions, objects, and/or data structures that are executed by the processors 204 to perform particular tasks or implement particular data types. More particularly, the memory 206 may include a module that is configured to identify one or more vehicles within a platoon (vehicle identification module 210) and a module that is configured to facilitate synchronization of vehicles within a platoon (synchronization module 212). Additionally, the memory 206 may include various data stores. For example, the memory 206 may include a database of vehicle identification data (vehicle ID data 214) as well as a database of current vehicle location data (location data 216). In some embodiments, the memory may include an application programming interface 218 that enables interaction between the platooning platform 116 and one or more vehicle 104 and/or UAV 106.

The vehicle identification module 210 may be configured to, in conjunction with the processor 204, identify vehicles in a platoon as well as locations of those respective vehicles within that platoon. In some embodiments, the vehicle identification module 210 may receive instructions from a lead vehicle, UAV, or other suitable device capable of providing such instructions. In some embodiments, the vehicle identification module 210 may receive automated routing instructions to be transmitted to a number of vehicles in a platoon. The vehicle identification module 210 then identifies the vehicles within the platoon that are to receive those instructions. In some embodiments, one or more vehicle identification numbers (VIN) may be stored in relation to each of the vehicles within a platoon. In some cases, an Embedded Universal Integrated Circuit Card (eUICC) ID, a Mobile Station International Subscriber Directory Number (MSISDN), an electronic serial number of the cellular transceiver in each vehicle, or some other suitable identifier may be associated with each vehicle in a platoon of vehicles. In some cases, a database may be maintained that stores information on which vehicles are included within a particular platoon of vehicles, an order of the vehicles within that platoon of vehicles, an indication of which of the vehicles are to be selected as group lead vehicles, or any other suitable vehicle/platoon information.

Once identified, the received instructions, or some modified version of those instructions, may be routed to the identified vehicles. In some embodiments, the vehicle identification module 210 may identify vehicles within particular groups of vehicles and/or a lead vehicle for the particular group.

The synchronization module 212 may be configured to, in conjunction with the processor 204, generate and/or modify instructions to be provided to one or more vehicles within a platoon in order to maintain a formation of the platoon. In some embodiments, the instructions may be generated to cause one or more of the vehicles in the platoon to obtain or maintain some predetermined amount of distance between itself and a vehicle in the platoon that is in front of it. In some cases, this may involve causing a speed of the vehicle to be adjusted to close or broaden a gap between the two vehicles.

As noted elsewhere, the platooning platform 116 may be in communication with a number of vehicles 104 and one or more UAV 106. An exemplary vehicle 104 may be any transportation vehicle as described herein that is capable of receiving and executing instructions. Each vehicle 104 may include a processor 220 and a computer readable memory 222 as well as a communication interface 223. The computer readable memory of the vehicle may include one or more software applications that enable automated driving of that vehicle. In some embodiments, the vehicle is configured to interact with the platooning platform using the API 218. For example, a lead vehicle may provide driving instructions to the platooning platform via an API call which are then distributed to other vehicles.

The communication interface 223 may include wireless and/or wired communication components that enable the vehicle to transmit or receive data via a wireless connection. In some embodiments, the communication interface 223 may include both short-range and long-range communication channels. In some embodiments, communications between vehicles may be established via a short-range communication channel of the communication interface 223 whereas communications between a vehicle and the platooning platform 116 may be established via a long-range communication channel. A short-range communication channel as included within communication interface 223 may include transmitters, receivers, transceivers, etc., and may be configured to send and/or receive short-range wireless communication signals (e.g., Bluetooth® signals, Zigbee® signals, infrared signals, WiFi signals, DSRC, Sidelink, etc.).

In some embodiments, the memory 222 may include one or more software modules. For example, the memory 222 may include at least a module that is configured to generate driving instructions for one or more vehicles of a platoon (instruction generation module 224) and a module that is configured to enable automated driving by the vehicle 104 (autonomous control module 225).

The instruction generation module 224 may be configured to, in conjunction with the processor 220, generate driving instructions to be executed by one or more vehicles in communication with the vehicle 104 (e.g., within a platoon of vehicles under the command of the vehicle 104). In some embodiments, this may comprise receiving data from one or more sensors installed within the vehicle 104 that indicates conditions of an environment in which the vehicle is located. The instruction generation module 224 may then determine one or more appropriate actions for the vehicle to take based on the received sensor data. In some embodiments, this comprises the use of one or more machine learning algorithms configured to enable the generation of driving instructions. By way of illustration, the instruction generation module 224 may receive image information from a camera device installed within the vehicle and may generate driving instructions from that received image data.

The autonomous control module 225 may be configured to, in conjunction with the processor 220, automate driving functions by executing driving instructions received by, or generated by, the vehicle 104. For example, the autonomous control module 225 may be configured to translate the driving instructions into commands to be executed by one or more hardware components of the vehicle 104. In some cases, such hardware components may comprise a steering wheel or steering column, a braking system, an acceleration system (e.g., a gas pedal), or any other component capable of enabling operation of the vehicle. The autonomous control module 225 may be configured to convey and execute instructions that are received from a lead vehicle.

In some embodiments, the platooning platform may be in communication with one or more UAVs 106. An exemplary UAV 106 may be any aerial vehicle capable of autonomous flight as described herein that is capable of receiving and executing instructions. Each UAV 106 may include a processor 226 and a computer readable memory 228 as well as a communication interface 230. The computer readable memory of the UAV may include one or more software applications that enable automated transit of the UAV. In some embodiments, the UAV is configured to interact with the platooning platform using the API 218. In some embodiments, the UAV may be configured to interact with the platooning platform using a long-range communication channel and to communicate with one or more vehicles 104 via a short-range communication channel.

Figure 3:
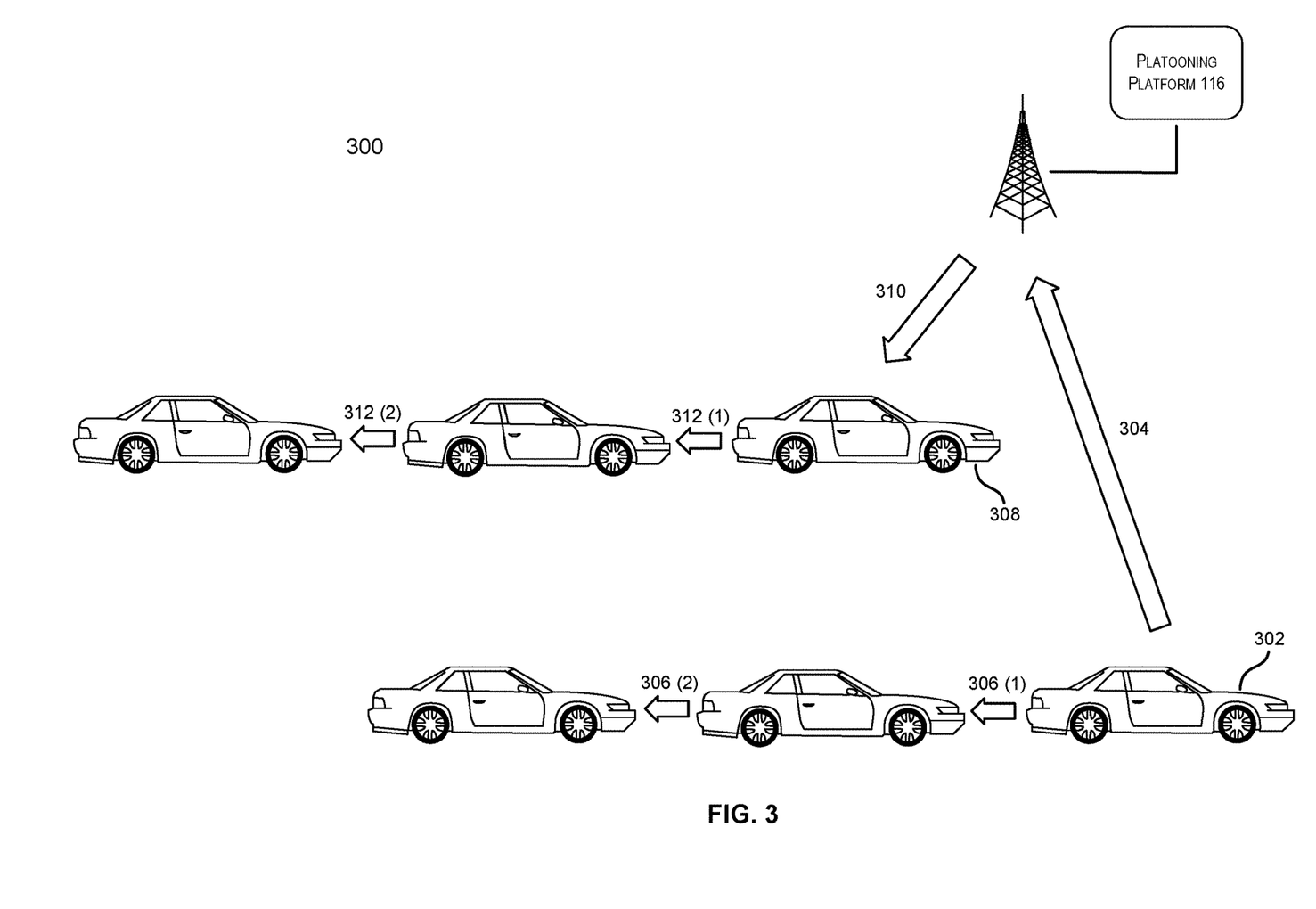
FIG. 3 depicts a illustrative diagram depicting a first process for transmitting instructions between vehicles performing platooning operations in accordance with embodiments.

FIG. 3 depicts a illustrative diagram depicting a first process for transmitting instructions between vehicles performing platooning operations in accordance with embodiments. The process 300 involves interactions between various components of the system 100 described with respect to FIG. 1. More particularly, the process 300 involves interactions between a platooning platform 116 and one or more vehicles, at least one of which may be a lead vehicle 302.

In some embodiments, a lead vehicle 302 may obtain data from one or more sensors installed in the lead vehicle, that may be used to generate driving instructions (e.g., via an instruction generation module 224 as described with respect to FIG. 2 above). The sensor data may be indicative of one or more actions taken by the lead vehicle. For example, the sensor data may indicate a current speed maintained by the lead vehicle, that the lead vehicle has changed direction or speed (e.g., velocity), that the lead vehicle has braked, or that the lead vehicle has taken any other suitable action. In some embodiments, the lead vehicle may be controlled by a software application that enables self-driving functionality, such as the autonomous control module 225 as described with respect to FIG. 2 above. In other embodiments, the lead vehicle may be controlled by a driver, either from within the lead vehicle or remotely.

Instructions may be generated by the lead vehicle based on the sensor data obtained from the sensors of the lead vehicle. Such instructions can be provided to the platooning platform 116 to be distributed to various groups of vehicles. In some embodiments, such instructions may be transmitted to a platooning platform 116 via a signal 304 transmitted over a long-range communication channel. In some embodiments, the instructions may also be transmitted to at least one second vehicle via a short-range communication channel 306. In some embodiments, the instructions may be transmitted by the lead vehicle to a second vehicle via communication channel 306 (1). The instructions may then be relayed by the second vehicle to a third vehicle via communication channel 306 (2). In some cases, the signal 306 (1) may be transmitted to the second vehicle substantially simultaneously to the transmission of signal 304.

Upon receiving the instructions from the lead vehicle via signal 304, the platooning platform 116 may identify at least one additional vehicle 308 to transmit the instructions to via a long-range communication channel via a signal 310. In some cases, the at least one additional vehicle 308 may be a lead vehicle of a group of vehicles within a platoon. The additional vehicle may then transmit the instructions to another vehicle via a signal 312 (1) transmitted over a short-range communication channel, which are then relayed to another vehicle via a signal 312 (2). In this manner, the instructions may be transmitted from vehicle to vehicle.

By way of illustrating the example depicted in FIG. 3, consider a system that uses both a short-range communication channel, such as WiFi, DSRC, Sidelink and a long-range communication channel, such as a cellular network, to assist the lead vehicle in guiding the vehicles of the platoon. In this example, the lead vehicle 302 may use the short-range communication channel to reliably communicate with a smaller number of vehicles in its vicinity. Simultaneously, the lead vehicle may pass instructions to other groups of vehicles via the long-range communication channel in order to allow the lead vehicle to lead each of the other groups of vehicles in the platoon.

In some embodiments, the platooning platform 116 processes the information received from the lead vehicle to negotiate with lead vehicles of other groups. In some embodiments, the platooning platform 116 may be configured to reassign a lead vehicle role based on a signal strength (e.g., a cellular signal strength of a base station that is detected by the radio transceiver of the vehicle) for one or more vehicles. For example, upon determining that a signal strength associated with a particular vehicle is stronger than the signal strength associated with other vehicles, the platooning platform 116 may assign that particular vehicle as the lead vehicle.

Figure 4:
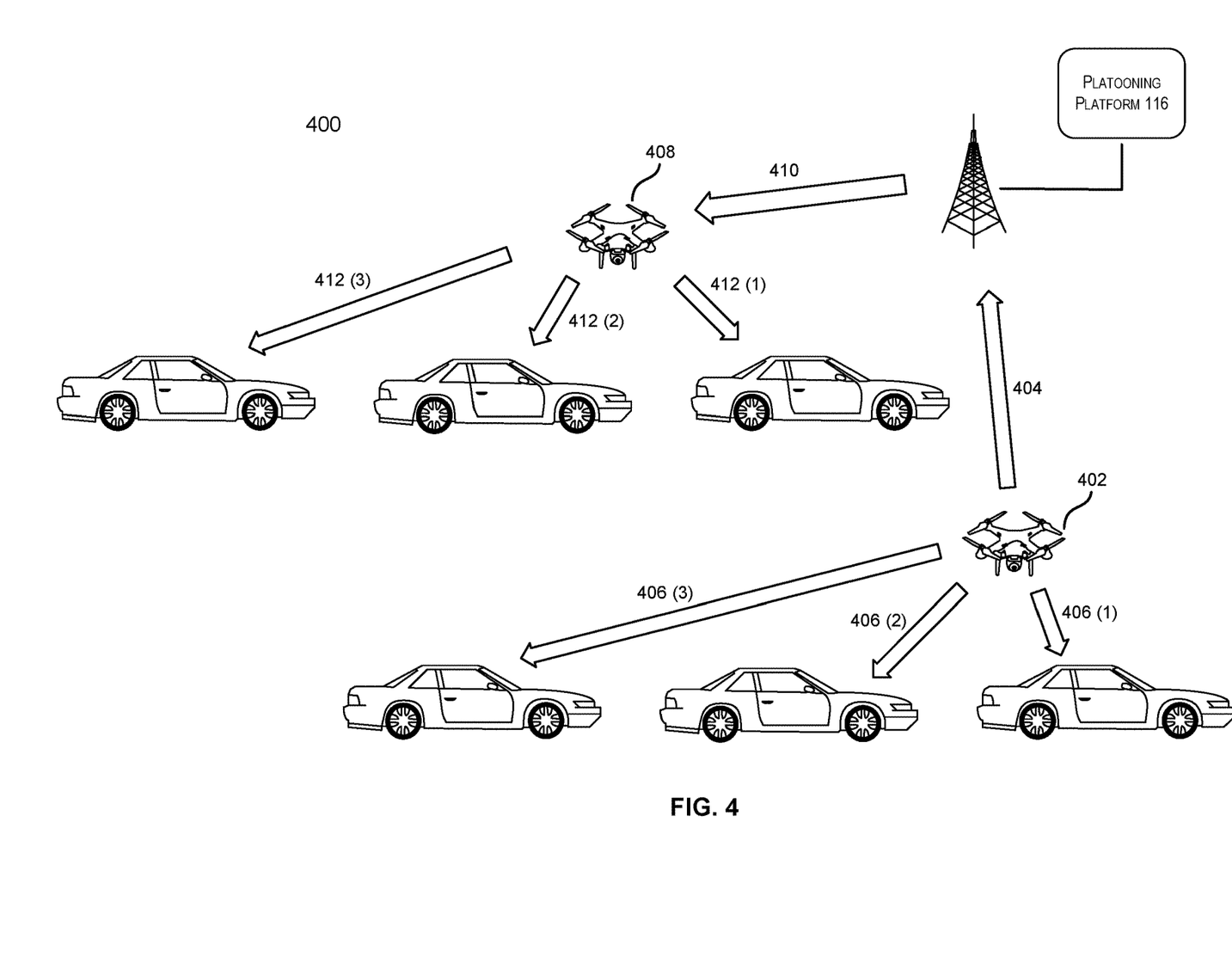
FIG. 4 depicts a illustrative diagram depicting a second process for transmitting instructions between vehicles performing platooning operations in accordance with embodiments.

FIG. 4 depicts an illustrative diagram depicting a second process for transmitting instructions between vehicles performing platooning operations in accordance with embodiments. The process 400 involves interactions between various components of the system 100 described with respect to FIG. 1. More particularly, the process 400 involves interactions between a platooning platform 116, one or more vehicles, and one or more UAVs.

In some embodiments, a UAV 402 may maintain a position in proximity to a platoon of vehicles and act as a lead vehicle in order to guide the vehicles of the platoon. In these embodiments, data is obtained from sensors installed on the UAV that indicate one or more road/traffic conditions. The data is then used to determine one or more instructions to be executed by vehicles within the platoon. In some embodiments, such instructions may be generated by a computing device installed within the UAV itself (e.g., using a software module configured to generate driving instructions for a vehicle). In other embodiments, the obtained data may be transmitted to an external computing device, and such instructions may be generated by that external computing device, such as a remote server in communication with the platooning platform. In some embodiments, instructions may be generated via the external computing device by a user viewing the obtained data (e.g., a remote driver).

Upon obtaining instructions to be provided to the vehicles in the platoon, such instructions can be provided by the UAV to the platooning platform 116 to be distributed to various groups of vehicles. In some embodiments, such instructions may be transmitted to a platooning platform via a signal 404 transmitted over a long-range communication channel. In some embodiments, the UAV may be positioned to maintain a line of sight to multiple vehicles and the instructions may also be transmitted to those multiple vehicles simultaneously (or substantially simultaneously) via a short-range communication channel 406. For example, the instructions may be transmitted by the UAV to a first vehicle via communication channel 406 (1), a second vehicle via communication channel 406 (2), and a third vehicle via communication channel 406 (3) at substantially the same time, preventing any delay in the execution of those instructions that may result in a lag from the communications.

Upon receiving the instructions from the UAV via the long-range signal 404 the platooning platform may identify other vehicles that should receive those instructions. In some embodiments, the platooning platform may identify a number of vehicle groups within the platoon as well as one or more additional UAVs 408 that are each assigned to a respective vehicle group. The platooning platform may then transmit the instructions to each of the identified UAVs 408 via a long-range signal 410. Upon receiving the instructions, each of the UAVs may relay those instructions to vehicles within a respective group of vehicles associated with that UAV. For example, the UAV may be positioned to maintain a line of sight to multiple vehicles in its respective group. The instructions may then be transmitted to those multiple vehicles simultaneously (or substantially simultaneously) via a short-range communication channel 412. For example, the instructions may be transmitted by the UAV 408 to a first vehicle via communication channel 412 (1), a second vehicle via communication channel 412 (2), and a third vehicle via communication channel 412 (3) at substantially the same time.

Figure 5:
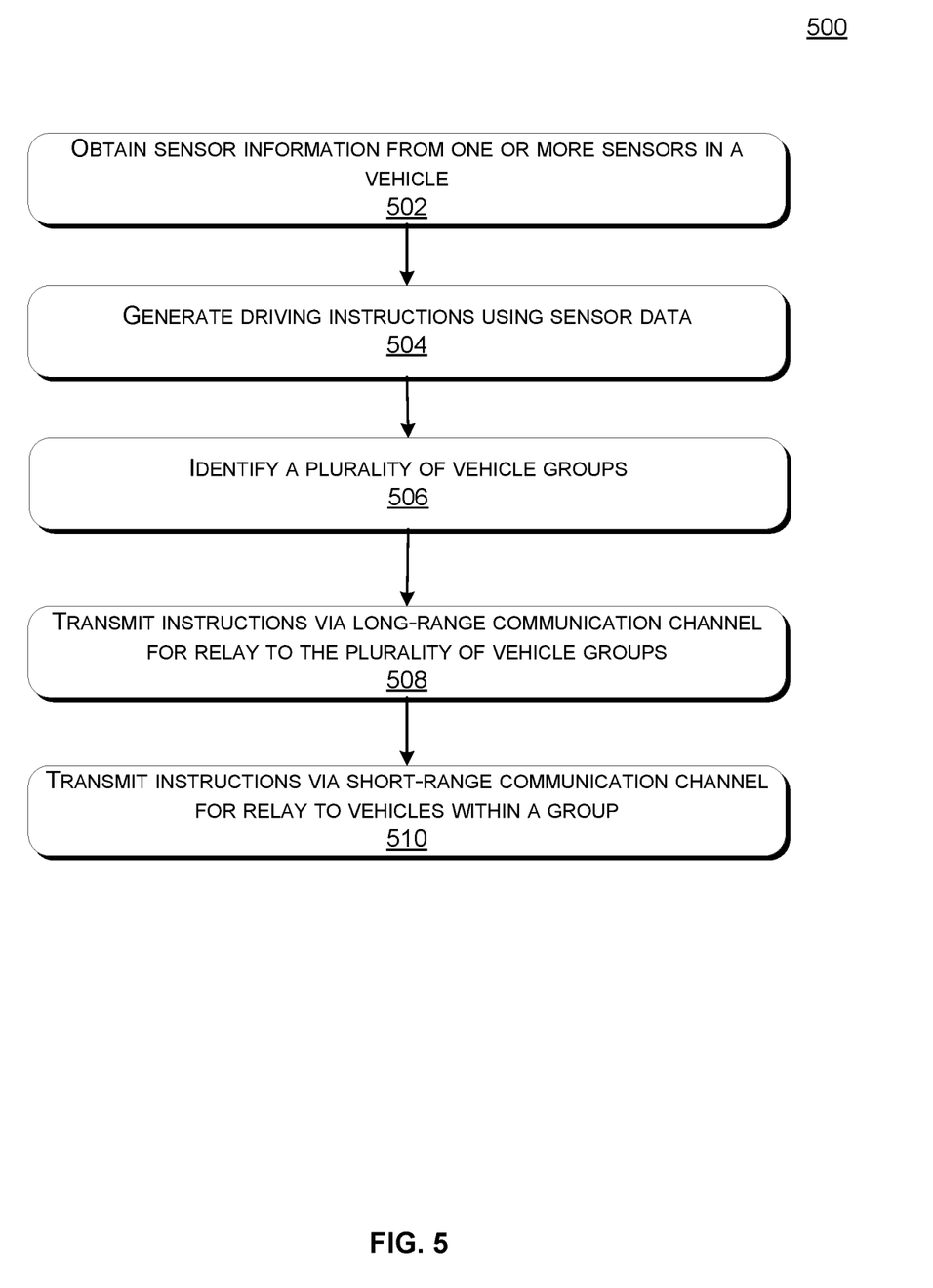
FIG. 5 depicts a block diagram showing an example process flow for facilitating communications between vehicles within a platoon in accordance with some embodiments.

FIG. 5 depicts a block diagram showing an example process flow for facilitating communications between vehicles within a platoon in accordance with some embodiments. In accordance with embodiments, the process 500 may be performed by components within a wireless carrier network 102 as discussed with respect to FIG. 1 above. For example, the process 500 may be performed by a lead vehicle of a platooning platform 116 in communication with multiple vehicles 104 and potentially one or more UAVs 106 as described with respect to FIG. 1 above. In some embodiments, the lead vehicle may be a UAV. In some cases, such a UAV is configured to maintain a position in proximity of group of vehicles within a platoon. In some cases, the UAV is configured to maintain a line of sight with each of the vehicles in the group of vehicles.

At 502, the process 500 comprises obtaining sensor data from one or more sensors installed upon a lead vehicle. In some embodiments, the one or more sensors comprises at least a camera device. In those embodiments, the sensor information comprises at least an image of the environment in which the computing device is located.

At 504, the process 500 comprises generating driving instructions using the sensor data. In some embodiments, the driving instructions to be executed by the platoon of vehicles are generated by a software application installed within the lead vehicle. In some embodiments, generating driving instructions to be executed by the platoon of vehicles comprises conveying the sensor information to a remote system, and receiving the driving instructions from the remote system. In some cases, the driving instructions are generated by a driver operating the remote system. For example, a driver may operate a device that simulates the inside of a vehicle. In this example, actions taken by the driver may be converted into driving instructions that are provided back to the lead vehicle.

At 506, the process 500 comprises identifying a plurality of vehicle groups within a platoon of vehicles. In some embodiments, a plurality of vehicle groups are identified based on a size of the platoon of vehicles and/or an optimal size of a vehicle group. In some embodiments, the platoon of vehicles may be broken up into a predetermined number of vehicle groups. In some embodiments, each of the number of vehicle groups may be assigned a group lead vehicle. For example, a vehicle at the front of each of the vehicle groups may be assigned as the group lead vehicle for that vehicle group. In some cases, the vehicles in the platoon of vehicles are configured to travel in a predetermined formation. In some cases, the driving instructions are generated to cause the at least one second vehicle to maintain the predetermined formation.

At 508, the process 500 comprises transmitting the generated instructions to a remote system via a long-range communication channel for relay to the plurality of vehicle groups. In some embodiments, the long-range communication channel comprises a cellular network. For example, the cellular network may be one that operates in accordance with technical standards such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), $4^{th}$ Generation (4G), $5^{th}$ Generation (5G). In some embodiments, driving instructions relayed to each of the plurality of separate groups of vehicles are relayed to a group lead vehicle for the respective group of vehicles.

At 510, the process 500 comprises transmitting, by the vehicle, the generated instructions to at least one additional vehicle in the plurality of vehicle groups via a short-range communication channel. In some embodiments, the short-range communication channel comprises one or more of Bluetooth, Zigbee, infrared, WiFi, DSRC, or Sidelink, etc.). In some embodiments, the at least one second vehicle of the platoon of vehicles relays the driving instructions to at least one third vehicle of the platoon of vehicles.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:
1. A method comprising:
obtaining, from one or more sensors in a primary lead unmanned aerial vehicle that is configured to lead a platoon of terrestrial, self-driving vehicles, sensor information pertaining to an environment in which the primary lead unmanned aerial vehicle is located;
accessing, by the primary lead unmanned aerial vehicle and from a database via an application programming interface, data indicating (i) a plurality of separate groups of terrestrial, self-driving vehicles (ii) a vehicle identification number and an embedded universal integrated circuit card identifier or a mobile station international subscriber directory number of a communication module of each terrestrial, self-driving vehicle in the plurality of separate groups;
accessing, by the primary lead unmanned aerial vehicle and from the database via the application programming interface, data indicating a formation of the terrestrial, self-driving vehicles within the platoon of terrestrial, self-driving vehicles;
accessing, by the primary lead unmanned aerial vehicle and from the database via the application programming interface, data indicating (i) a plurality of secondary lead unmanned aerial vehicles that are each configured to lead a group of terrestrial, self-driving vehicles of the plurality of separate groups of terrestrial, self-driving vehicles and (ii) an embedded universal integrated circuit card identifier or a mobile station international subscriber directory number of a communication module of each secondary lead unmanned aerial vehicle;
based on the sensor information and the data indicating the formation of the terrestrial, self-driving vehicles within the platoon of terrestrial, self-driving vehicles, generating, by the primary lead unmanned aerial vehicle and using a machine learning algorithm, driving instructions (i) that are executed by a steering column, a braking system, and an acceleration system of each terrestrial, self-driving vehicle of the plurality of separate groups of terrestrial, self-driving vehicles and (ii) that cause each terrestrial, self-driving vehicle of the plurality of separate groups of terrestrial, self-driving vehicles to obtain or maintain a predetermined amount of distance between itself and another terrestrial, self-driving vehicle in the platoon that is in front of the terrestrial, self-driving vehicle;
transmitting, by the primary lead unmanned aerial vehicle and to each secondary lead unmanned aerial vehicle of the plurality of secondary lead unmanned aerial vehicles, the generated driving instructions via a long-range communication channel and via the communication modules with the embedded universal integrated circuit card identifiers or the mobile station international subscriber directory numbers of each secondary lead unmanned aerial vehicle, the driving instructions being simultaneously relayed to each terrestrial, self-driving vehicle of the plurality of separate groups of terrestrial, self-driving vehicles by the secondary lead unmanned aerial vehicle leading each group of terrestrial, self-driving vehicles via a short-range communication channel; and
transmitting, by the primary lead unmanned aerial vehicle, the generated driving instructions to at least one additional terrestrial, self-driving vehicle of the platoon of terrestrial, self-driving vehicles that is within a line of sight of the primary lead unmanned aerial vehicle via a short-range communication channel and via the communication modules with the embedded universal integrated circuit card identifiers or the mobile station international subscriber directory numbers of the least one additional terrestrial, self-driving vehicle, wherein each terrestrial, self-driving vehicle of the plurality of the separate groups of terrestrial, self-driving vehicles obtains or maintains the predetermined amount of distance between itself and the other terrestrial, self-driving vehicle in the platoon that is in front of the terrestrial, self-driving vehicle by executing the driving instructions using the steering column, the braking system, and the acceleration system.

2. The method of claim 1, wherein the driving instructions to be executed by the platoon of terrestrial, self-driving vehicles are generated by a software application installed within the primary lead unmanned aerial vehicle.

3. The method of claim 1, wherein the long-range communication channel comprises a cellular network.

4. The method of claim 1, wherein the secondary lead unmanned aerial vehicle for the respective group of terrestrial, self-driving vehicles is assigned based on a signal strength between a base station and each secondary lead unmanned aerial vehicle.

5. The method of claim 1, wherein the at least one second terrestrial, self-driving vehicle of the platoon of terrestrial vehicles relays the driving instructions to at least one third terrestrial, self-driving vehicle of the platoon of terrestrial vehicles.

6. A computing device comprising:
a processor; and
a memory including instructions that, when executed with the processor, cause the computing device to, at least:
obtain, from one or more sensors, sensor information pertaining to an environment in which the computing device is located;
access, from a database via an application programming interface, data indicating (i) a plurality of separate groups of terrestrial, self-driving vehicles (ii) a vehicle identification number and an embedded universal integrated circuit card identifier or a mobile station international subscriber directory number of a communication module of each terrestrial, self-driving vehicle in the plurality of separate groups;
access, from the database via the application programming interface, data indicating a formation of the terrestrial, self-driving vehicles within the platoon of terrestrial, self-driving vehicles;
access, from the database via the application programming interface, data indicating (i) a plurality of secondary lead unmanned aerial vehicles that are each configured to lead a group of terrestrial, self-driving vehicles of the plurality of separate groups of terrestrial, self-driving vehicles and (ii) an embedded universal integrated circuit card identifier or a mobile station international subscriber directory number of a communication module of each secondary lead unmanned aerial vehicle;
based on the sensor information and the data indicating the formation of the terrestrial, self-driving vehicles within the platoon of terrestrial, self-driving vehicles, generate, by the primary lead unmanned aerial vehicle and using a machine learning algorithm, driving instructions (i) that are executed by a steering column, a braking system, and an acceleration system of each terrestrial, self-driving vehicle of the plurality of separate groups of terrestrial, self-driving vehicles and (ii) that cause each terrestrial, self-driving vehicle of the plurality of separate groups of terrestrial, self-driving vehicles to obtain or maintain a predetermined amount of distance between itself and another terrestrial, self-driving vehicle in the platoon that is in front of the terrestrial, self-driving vehicle;
transmit, to each secondary lead unmanned aerial vehicle of the plurality of secondary lead unmanned aerial vehicles, the generated driving instructions to a platooning platform via a long-range communication channel and via the communication modules with the embedded universal integrated circuit card identifiers or the mobile station international subscriber directory numbers of each secondary lead unmanned aerial vehicle, the driving instructions being relayed to each of the plurality of separate groups of terrestrial, self-driving vehicles by the secondary lead unmanned aerial vehicle leading each group of terrestrial, self-driving vehicles via a short-range communication channel; and
transmit the generated driving instructions to at least one second terrestrial, self-driving vehicle of the platoon of terrestrial, self-driving vehicles that is within a line of sight of the computing device via a short-range communication channel and via the communication modules with the embedded universal integrated circuit card identifiers or the mobile station international subscriber directory numbers of the at least one additional terrestrial, self-driving vehicle,
wherein each terrestrial, self-driving vehicle of the plurality of the separate groups of terrestrial, self-driving vehicles obtains or maintains the predetermined amount of distance between itself and the other terrestrial, self-driving vehicle in the platoon that is in front of the terrestrial, self-driving vehicle by executing the driving instructions using the steering column, the braking system, and the acceleration system.

7. The computing device of claim 6, wherein the computing device is included within the primary lead unmanned aerial vehicle (UAV) that is configured to lead the platoon of terrestrial, self-driving vehicles.

8. The computing device of claim 7, wherein the primary lead UAV is configured to maintain a position in proximity of the at least one additional terrestrial, self-driving vehicle.

9. The computing device of claim 8, wherein the primary lead UAV is configured to maintain the line of sight with the at least one additional terrestrial, self-driving vehicle.

10. The computing device of claim 6, wherein the terrestrial, self-driving vehicles in the platoon of terrestrial, self-driving vehicles are configured to travel in a predetermined formation.

11. The computing device of claim 10, wherein the driving instructions cause the terrestrial, self-driving vehicles in the platoon of terrestrial, self-driving vehicles to maintain the predetermined formation.

12. The computing device of claim 6, wherein the short-range communication channel comprises one or more of Bluetooth®, Zigbee®, infrared, WiFi, DSRC, or Sidelink.

13. The computing device of claim 6, wherein the sensor information comprises at least an image of the environment in which the computing device is located.

14. The computing device of claim 6, wherein the long-range communication channel comprises a cellular network.

15. A non-transitory computer-readable media collectively storing computer-executable instructions that upon execution cause one or more computing devices to collectively perform acts comprising:
  obtaining, from one or more sensors, sensor information pertaining to an environment in which the computing device is located;
  accessing, from a database via an application programming interface, data indicating (i) a plurality of separate groups of terrestrial, self-driving vehicles (ii) a vehicle identification number and an embedded universal integrated circuit card identifier or a mobile station international subscriber directory number of a communication module of each terrestrial, self-driving vehicle in the plurality of separate groups;
  accessing, from the database via the application programming interface, data indicating a formation of the terrestrial, self-driving vehicles within the platoon of terrestrial, self-driving vehicles;
  accessing, from the database via the application programming interface, data indicating (i) a plurality of secondary lead unmanned aerial vehicles that are each configured to lead a group of terrestrial, self-driving vehicles of the plurality of separate groups of terrestrial, self-driving vehicles and (ii) an embedded universal integrated circuit card identifier or a mobile station international subscriber directory number of a communication module of each secondary lead unmanned aerial vehicle;
  based on the sensor information and the data indicating the formation of the terrestrial, self-driving vehicles within the platoon of terrestrial, self-driving vehicles, generating, by the primary lead unmanned aerial vehicle and using a machine learning algorithm, driving instructions (i) that are executed by a steering column, a braking system, and an acceleration system of each terrestrial, self-driving vehicle of the plurality of separate groups of terrestrial, self-driving vehicles and (ii) that cause each terrestrial, self-driving vehicle of the plurality of separate groups of terrestrial, self-driving vehicles to obtain or maintain a predetermined amount of distance between itself and another terrestrial, self-driving vehicle in the platoon that is in front of the terrestrial, self-driving vehicle;
  transmitting, to each secondary lead unmanned aerial vehicle of the plurality of secondary lead unmanned aerial vehicles, the generated driving instructions to a platooning platform via a long-range communication channel and via the communication modules with the embedded universal integrated circuit card identifiers or the mobile station international subscriber directory numbers of each secondary lead unmanned aerial vehicle, the driving instructions being relayed to each of the plurality of separate groups of terrestrial, self-driving vehicles by the secondary lead unmanned aerial vehicle leading each group of terrestrial, self-driving vehicles via a short-range communication channel; and
  transmitting the generated driving instructions to at least one second terrestrial, self-driving vehicle of the platoon of terrestrial, self-driving vehicles that is within a line of sight of the computing device via a short-range communication channel and via the communication modules with the embedded universal integrated circuit card identifiers or the mobile station international subscriber directory numbers of the least one additional terrestrial, self-driving vehicle,
  wherein each terrestrial, self-driving vehicle of the plurality of the separate groups of terrestrial, self-driving vehicles obtains or maintains the predetermined amount of distance between itself and the other terrestrial, self-driving vehicle in the platoon that is in front of the terrestrial, self-driving vehicle by executing the driving instructions using the steering column, the braking system, and the acceleration system.

16. The computer-readable media of claim 15, wherein the long-range communication channel comprises a cellular network.

17. The computer-readable media of claim 15, wherein the short-range communication channel comprises one or more of Bluetooth®, Zigbee®, infrared, WiFi, DSRC, Sidelink.

* * * * *